US012460121B2

(12) United States Patent
Liang et al.

(10) Patent No.: US 12,460,121 B2
(45) Date of Patent: Nov. 4, 2025

(54) COMPOSITION, PREPARATION METHOD FOR AND APPLICATION OF COMPOSITION, AND SELF-HEALING METHOD FOR WELL CEMENTING IN OIL/GAS FIELD

(71) Applicant: CHINA PETROLEUM & CHEMICAL CORPORATION, Beijing (CN)

(72) Inventors: Hongwen Liang, Beijing (CN); Gewei Peng, Beijing (CN); Hailiang Zhang, Xiangtan (CN); Xiaojun Mo, Beijing (CN); Fan Yang, Beijing (CN); Junhua Zhang, Beijing (CN); Xu Wang, Beijing (CN); Qichun Wang, Beijing (CN); Min Zeng, Beijing (CN)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 459 days.

(21) Appl. No.: 18/005,914

(22) PCT Filed: Jul. 21, 2021

(86) PCT No.: PCT/CN2021/107562
§ 371 (c)(1),
(2) Date: Jan. 18, 2023

(87) PCT Pub. No.: WO2022/022355
PCT Pub. Date: Feb. 3, 2022

(65) Prior Publication Data
US 2023/0295483 A1 Sep. 21, 2023

(30) Foreign Application Priority Data
Jul. 31, 2020 (CN) .......................... 202010759397.8

(51) Int. Cl.
*C09K 8/493* (2006.01)
*C04B 14/36* (2006.01)
*C04B 24/26* (2006.01)

(52) U.S. Cl.
CPC ............ *C09K 8/493* (2013.01); *C04B 14/368* (2013.01); *C04B 24/2676* (2013.01)

(58) Field of Classification Search
None
See application file for complete search history.

(56) References Cited

U.S. PATENT DOCUMENTS 6,516,884 B1  2/2003  Chatterji et al.
7,530,396 B1  5/2009  Reddy et al.
(Continued)

FOREIGN PATENT DOCUMENTS

AU  2011268764 A1  12/2011
CN  102031097 A  4/2011
(Continued)

OTHER PUBLICATIONS

International Search Report (PCT/ISA/210) with an English translation, and Written Opinion (PCT/ISA/237) mailed on Oct. 25, 2021, by the China National Intellectual Property Administration as the International Searching Authority for International Application No. PCT/CN2021/107562. (10 pages).

Primary Examiner — Jeffrey D Washville
(74) Attorney, Agent, or Firm — Panitch Schwarze Belisario & Nadel LLP

(57) ABSTRACT

Described are a self-healing composition, and a preparation method for and an application of the composition. The composition is of a core-shell structure; the core contains a hydrogenated styrenic thermoplastic elastomer polymer and an inorganic filler; the shell contains a hydrophilic polymer; the composition has a density of 1.2-2 g/cm³, a water contact angle of no more than 90°, and a diesel oil and/or natural gas (Continued)

absorption expansion ratio of 5-15 times. By coating the hydrogenated styrenic thermoplastic elastomer and the inorganic filler with the hydrophilic (surface polarized) polymer, a core-shell structure is formed. When the composition is used for well cementing in an oil/gas field, the composition has a density and compatibility matching cement mortar and thus can form a uniform and stable cement slurry for well cementing in the oil/gas field, and has excellent oil/gas absorption expansion performance and thus can expand after absorbing oil/gas to perform self-healing.

16 Claims, 3 Drawing Sheets

(56) References Cited

U.S. PATENT DOCUMENTS

| | | | |
|---|---|---|---|
| 2006/0246272 A1* | 11/2006 | Zhang | A61F 13/53708 428/304.4 |
| 2009/0308611 A1 | 12/2009 | Santra et al. | |
| 2013/0146286 A1 | 6/2013 | Le Roy-Delage et al. | |
| 2014/0166285 A1 | 6/2014 | Santra et al. | |
| 2016/0108305 A1 | 4/2016 | Murphy et al. | |
| 2017/0306212 A1 | 10/2017 | Le Roy-Delage et al. | |
| 2018/0037798 A1 | 2/2018 | Mishra | |
| 2019/0161669 A1 | 5/2019 | Droger et al. | |

FOREIGN PATENT DOCUMENTS

| | | |
|---|---|---|
| CN | 104177555 A | 12/2014 |
| CN | 104448087 A | 3/2015 |
| CN | 105952413 A | 9/2016 |
| CN | 106554764 A | 4/2017 |
| CN | 106565383 A | 4/2017 |
| CN | 107973538 A | 5/2018 |
| CN | 108219332 A | 6/2018 |
| CN | 108409178 A | 8/2018 |
| CN | 110257126 A | 9/2019 |
| CN | 110845175 A | 2/2020 |
| CN | 111039591 A | 4/2020 |
| CN | 111040746 A | 4/2020 |
| CN | 111255411 A | 6/2020 |
| EP | 0636591 A1 | 2/1995 |
| JP | 2015-13802 A | 1/2015 |
| JP | 2016-61127 A | 4/2016 |
| JP | 2017-537209 A | 12/2017 |
| RU | 2 539 054 C2 | 1/2015 |
| WO | 2007074330 A1 | 7/2007 |

* cited by examiner 20 mesh 40 mesh 60 mesh

COMPOSITION, PREPARATION METHOD FOR AND APPLICATION OF COMPOSITION, AND SELF-HEALING METHOD FOR WELL CEMENTING IN OIL/GAS FIELD

CROSS REFERENCE TO RELATED APPLICATIONS

The application claims the interest of the Chinese Patent Application No. 202010759397.8, filed on Jul. 31, 2020 and entitled "COMPOSITION, PREPARATION METHOD FOR AND APPLICATION OF COMPOSITION, AND SELF-HEALING METHOD FOR WELL CEMENTING IN OIL/GAS FIELD", the content of which is entirely incorporated herein by reference.

TECHNICAL FIELD

The present invention relates to the technical field of cement slurry material for well cementing in an oil/gas field, and in particular to a composition comprising a surface polarized styrenic thermoplastic elastomer, a preparation method thereof and an use thereof as a self-healing agent for well cementing in an oil/gas field, a cement slurry for well cementing in an oil/gas field, and a well cementing in an oil/gas field.

BACKGROUND ART

The well cementing engineering is a key sector for connecting the well drilling operations and the exploitation of oil and gas resources. The program includes placing a certain size of casing into the underground, and injecting a cement slurry into the annulus between the casing and the borehole wall after the casing is finished. The injected hydraulic cementitious material (i.e., cement slurry) is setting and hardening into a cement annulus within a certain time period to form a well cementing in an oil/gas field. The functions of the cement annulus includes providing support for the casing pipes, preventing corrosion of the casing pipes by the formation fluid, sealing the complex strata such as leakage zone and collapsed formation, and isolating the oil and gas layer from a water layer, thereby laying the foundation for layered development of the oil and gas resources. The high quality cement annulus should maintain long term seal integrity, which is critical to the production life of oil and gas well and directly affects the oil and gas exploitation in the later stage. However, the oil and gas leakage is a worldwide problem due to cracking of the oil well cement annulus resulting from the impact loading or movement of the complex strata and long term chemical erosion of the erosive media, and the oil and gas leakage has given rise to tremendous economic loss. Therefore, it is indispensable to repair cracks generated in the cement annulus.

Currently, the well cementing cement annulus repair technologies in China and foreign countries are mainly composed of the cement extrusion operation and microfracture self-healing technologies with the cement-based materials. The former has a high operation risk, low success rate and high cost, thus it is not suitable for further development of well cementing operations. The latter has been widely used for self-healing with the cement-based materials, it is one of the research focuses in the well-cementing operation with cement, the self-healing technologies mainly involve with the liquid core or hollow fiber technology, microcapsule technology, thermally reversible crosslinking reaction and stimulus-responsive type polymer technology. Both the liquid core or hollow fiber technology and the microcapsule technology involve with the arrangements that a repair agent is preset in a cement substrate and a repair agent is disposed in the coating material. Upon rupturing of the coating material under the influence of pressure or temperature and other factors, the repair agent is released to repair the fractures. However, the technologies impose high requirements on the coating material. The thermally reversible crosslinking reaction technology is implemented by presetting a cross-linking polymer with thermally reversible reaction property in the cement substrate to allow repairing for many times along with the ambient temperature changes. However, such technologies suffer from the high research costs, thereby limiting its practical applications. The stimulus-responsive type polymer technology is performed by placing in advance a polymer material with responsiveness to oil and gas. The polymer material will swell upon contacting and absorbing the oil and gas, thereby plugging the fractures and producing the self-healing effect.

The polymers used in stimulus-responsive type polymer technology are usually oil absorbing resins or elastomer latexes, although the polymers produce a desired self-healing effect, they have poor heat resistance and durability, limiting their application in the engineering projects. CN105952413A discloses a self-healing cement containing styrene-butadiene-styrene or styrene-isoprene-styrene polymer particles, but the self-healing cement still needs to be further improved in the self-healing effect and service life.

SUMMARY OF THE INVENTION

The present invention aims to overcome the above problems in the prior art by providing a novel self-healing agent having a desirable self-healing effect and a longer service life.

In order to fulfill the above purpose, a first aspect the present invention provides a composition, it is characterized in that the composition has a density of 1.2-2 $g/cm^3$, a water contact angle not more than 90°, preferably less than 85°, and a diesel oil and/or natural gas absorption expansion ratio of 5-15 times, preferably 8-12 times.

A second aspect of the invention provides a method for preparing a composition, the method comprises the following steps:
(1) uniformly mixing a hydrogenated styrenic thermoplastic elastomer with an inorganic filler to obtain a mixed material, and subjecting the mixed material to extrusion granulation under the melting conditions of said hydrogenated styrenic thermoplastic elastomer;
(2) coating the pellets obtained in step (1) with a hydrophilic polymer to obtain a granular material.

In a third aspect, the invention provides a cement slurry for well cementing in the oil/gas field comprising the aforesaid composition or the composition produced with the aforesaid preparation method.

In a fourth aspect, the invention further provides an use of the aforesaid composition or the composition produced with the aforesaid preparation method in well cementing in an oil and gas field, preferably an use as a self-healing agent for well cementing in an oil and gas field.

In a fifth aspect, the present invention provides a cement block and well cementing in an oil/gas field formed by the aforesaid cement slurry for well cementing in the oil/gas field.

In a sixth aspect, the present invention provides a self-healing method for well cementing in an oil/gas field, the method comprises forming well cementing in an oil/gas field by using the aforesaid cement slurry for well cementing in the oil/gas field, or the aforesaid cement block for well cementing in an oil/gas field, and subsequently contacting the well cementing in an oil/gas field with the oil and gas when cracks appear in the well cementing in an oil/gas field.

The present invention provides a composition for forming granular materials having a structure similar with a core-shell structure by increasing weight by using an inorganic filler and coating a hydrogenated styrenic thermoplastic elastomer/inorganic filler composite with a hydrophilic (surface polarized) polymer, ensuring a desirable density, a water contact angle and an oil/gas absorption expansion coefficient of the composition, when the composition is used in a well cementing in an oil/gas field, it has the density and compatibility that match with a cement mortar, provides a uniformly stable cement slurry for well cementing in the oil/gas field, and exhibits desired oil/gas absorption expansion performance, thereby expansive after absorbing oil and gas and allowing for self-healing.

The composition of the present invention, in addition to using a hydrophilic polymer providing hydrophilicity and an inorganic filler providing a density compatible with cement, uses a hydrogenated thermoplastic elastomer, which not only improves the bonding force between the inorganic filler and the hydrophilic polymer, but also enhances the anti-aging property of the composition, thereby greatly improving the self-healing effect and the service life during an use as a self-healing agent. Specifically, the present invention has the following advantageous effects:

1. The self-healing agent of the present invention is used as a expansive agent upon contacting and absorbing an oil and gas, it has the characteristics such as high speed of oil and gas absorption, high rate, desired heat resistance and durability, and excellent mechanical properties of the expansive body.
2. The self-healing agent of the present invention has a similar density with the cement slurry, and exhibits a good affinity, is uniformly and stably dispersed in the cement slurry, so as to facilitate the engineering applications.
3. The self-healing agent of the present invention produces an ideal effect of reducing the elasticity modulus of the cement slurry, can effectively reduce the emergence of micro-annuals and micro-fissures, thereby improving the long-lasting sealing effect of the cement annulus in the oil and gas wells.

DETAILED DESCRIPTION OF THE INVENTION

Figure 1:
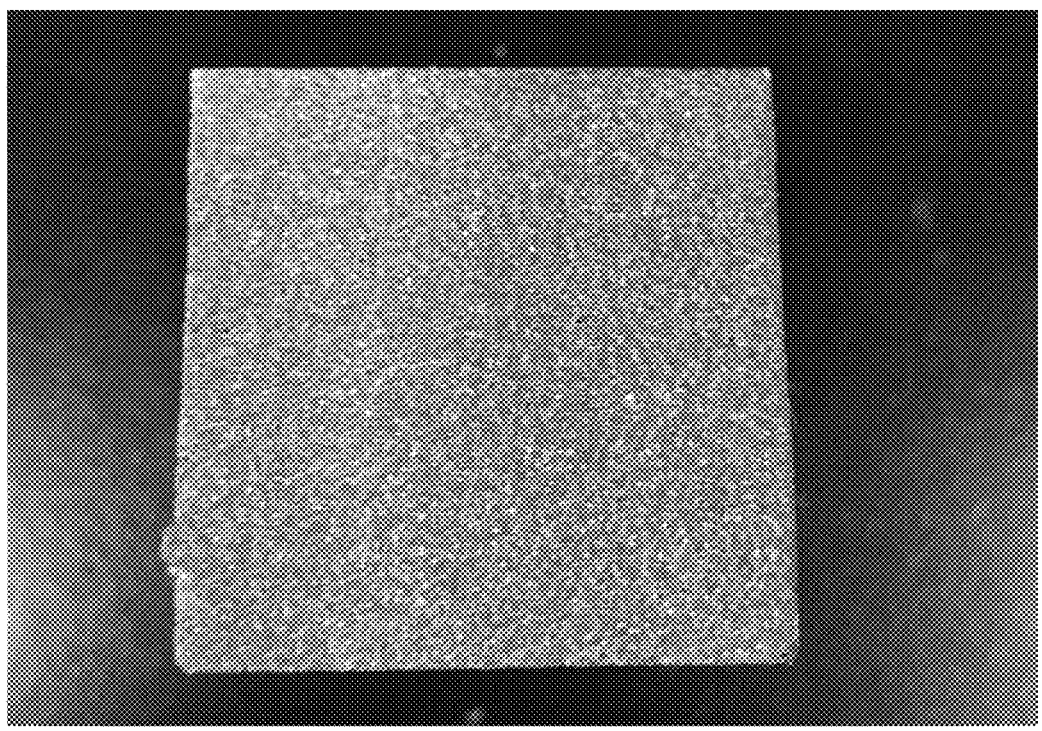
FIG. 1 illustrates a photograph showing the dispersion of a self-healing agent composition having a particle size of 80 mesh in the cement stone, wherein the white part represents the self-healing agent composition and the black-grey part represents the cement stone. As can be seen, the self-healing agent is uniformly distributed in the cement stone.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present application provides a composition having a density of 1.2-2 g/cm$^3$, preferably 1.3-1.8 g/cm$^3$, more preferably 1.4-1.8 g/cm$^3$, a water contact angle less than 90°, preferably less than 85°, and a diesel oil and/or natural gas absorption expansion ratio of 5-15 times, preferably 8-12 times.

The composition may be in various shapes, such as a granular or powdered form. Preferably, the composition is a sieved material obtained after passing through 20 mesh to 200 mesh sieve, preferably 20 mesh to 100 mesh sieve.

The density of the composition of the present invention is the real density as measured by the method stipulated in the National Standard GB/T21354-2008 of China.

In the present invention, the water contact angle is measured by using the method stipulated in the National Standard GB/T36086-2018 of China. The water contact angle serves to indicate the compatibility (affinity) with cement when the composition of the present invention is used as a cement slurry self-healing agent for well cementing in an oil/gas field, the larger is the water contact angle, it indicates less compatibility with cement. The compositions of the present invention has a water contact angle less than 90°, preferably less than 85°, it exhibits a suitable cement compatibility. The water contact angle of the composition may be, for example, 70°, 71°, 72°, 73°,74°, 75°,76°, 77°, 78°, 79°, 80°, 81°, 82°, 83°, 84°, 85°, 85.5°, 86°, 87°, 88°, 89°.

In the present invention, the diesel oil and/or natural gas absorption expansion ratio refers to a ratio of a volume when the composition sufficiently contacts the diesel oil and/or natural gas to reach a saturation adsorption relative to a volume of the composition before the contact. The larger is the diesel oil and/or natural gas absorption expansion ratio, it indicates that the greater is the self-healing capability and vice versa.

In the present invention, "the composition sufficiently contacts the diesel oil and/or natural gas to reach a saturation adsorption" refers to a state that the composition is sufficiently impregnated/soaked in an excessive amount of diesel oil and/or natural gas until the volume of said composition no longer expands.

According to a preferred embodiment of the present invention, the composition comprises a hydrogenated styrenic thermoplastic elastomer, an inorganic filler, and a hydrophilic substance (e.g. a hydrophilic polymer) coated on a surface of the hydrogenated styrenic thermoplastic elastomer and the inorganic filler.

In order to achieve a superior cement compatibility and self-healing capability of the composition, a weight ratio of the hydrogenated styrenic thermoplastic elastomer to the inorganic filler in the present invention is 30:70 to 70:30, preferably 40:60 to 60:40.

In the present invention, the hydrophilic polymer is used for providing the composition with sufficient hydrophilicity to ensure a suitable water contact angle. The hydrophilic polymer generally contains hydrophilic functional group, which is preferably one or more selected from the group consisting of a hydroxyl radical, an amino group, a carboxyl group and a sulfonic acid group. The number of said hydrophilic functional groups each may be one or more. The amino group may be one or more selected from the group consisting of primary amino group, secondary amino group, tertiary amino group and quaternary ammonium salt. The carboxyl group can be represented by —COOM, and the sulfonic acid group can be represented by —SO$_3$M, where M may be H, or any one or more selected from the group consisting of alkali metal elements such as K and Na.

Preferably, the hydrophilic polymer is one or more selected from the group consisting of polyvinyl alcohols, poly(meth)acrylic acid and its (alkali) metal salts, chitosan, guar gum, sodium alginate, starch, carboxymethylcellulose (sodium) and the like.

Preferably, the hydrophilic polymer may have a number average molecular weight of 100 to 300,000.

Preferably, the content of polar groups (hydrophilic functional groups) in the hydrophilic polymer is 0.1-0.6 g/g polymer.

In the present invention, the amount of polar groups can be determined by $^1$HNMR. The content of polar groups in the raw material can be derived from information provided by the raw material supplier.

In the present invention, the water soluble polymer is coated on a surface of particles formed by an inorganic filler or an inorganic filler and a hydrogenated styrenic thermoplastic elastomer.

Preferably, said inorganic filler has a density within a range of 2.5-6.0 g/cm$^3$ such that the composition is used as a self-healing agent for favorable compatibility with cement.

Preferably, the inorganic filler has a particle size of 10-15 µm.

The inorganic filler may be various inorganic pellets with smaller particles and can be desirably compatible with the cement, preferably the inorganic filler is one or more selected from the group consisting of ground calcium carbonate, barite, barium sulfate, iron ore powder, cement and quartz sand.

The addition of an inorganic filler can increase density of the composition, such that the composition may form a uniform and stable slurry with the cement, thereby improving stability of the cement slurry for well cementing when used as a self-healing agent.

Preferably, the composition has a density of 1.2-1.8 g/cm$^3$, such as 1.2, 1.25, 1.30, 1.34, 1.36, 1.40, 1.45, 1.50, 1.55, 1.60, 1.70, 1.75 g/cm$^3$.

According to a preferred embodiment of the present invention, a hydrogenated styrenic thermoplastic elastomer and an inorganic filler are obtained by subjecting the hydrogenated styrenic thermoplastic elastomer to extrusion granulation under the melting conditions, such that the hydrogenated styrenic thermoplastic elastomer is coated on a surface of the inorganic filler, and a hydrophilic polymer further coats the surface of said hydrogenated styrenic thermoplastic elastomer and said inorganic filler.

Preferably, a weight ratio of the hydrogenated styrenic thermoplastic elastomer to the hydrophilic polymer is from 1:0.01 to 1:0.1.

Preferably, the hydrogenated styrenic thermoplastic elastomer has a hydrogenation degree of 95-100%, more preferably 97-100%.

A preparation method and a test method for hydrogenation degree of the hydrogenated styrenic thermoplastic elastomers are described in WO 2020/088454, the content of which is entirely incorporated herein by reference.

The hydrogenated styrenic thermoplastic elastomer may have a linear structure or a star structure. Preferably, the linear structure having a number average molecular weight of 40,000-150,000, or a star structure having a number average molecular weight of 120,000-320,000. By selecting the hydrogenated styrenic thermoplastic elastomer with the above-mentioned molecular weight, the better economical efficiency can be obtained while ensuring desirable self-healing capability.

In the present invention, the number average molecular weight is measured by gel chromatography.

In the present invention, the hydrogenated styrenic thermoplastic elastomer may be a hydrogenated styrene/conjugated diene copolymer, which comprises a styrenic structural unit represented by formula 1, a hydrogenated conjugated diene structural unit represented by formula 2, and/or a hydrogenated conjugated diene structural unit represented by formula 3.

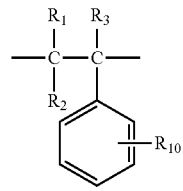

Formula 1

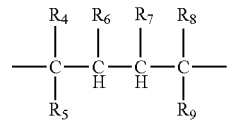

Formula 2

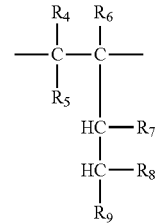

Formula 3

Wherein each of $R_1$, $R_2$, $R_3$, $R_4$, $R_5$, $R_6$, $R_7$, $R_8$, $R_9$ is H, a C1-C3 alkyl, and $R_{10}$ is H or a C1-C4 alkyl.

Preferably, the hydrogenated styrenic thermoplastic elastomer is one or more selected from the group consisting of hydrogenated styrene-butadiene-styrene triblock copolymer, hydrogenated styrene-isoprene-styrene triblock copolymer, and styrene-isobutylene-styrene triblock copolymer.

Preferably, the hydrogenated styrenic thermoplastic elastomer contains styrenic structural units in an amount of 20-50 wt %, more preferably 25-50 wt %, and 1,2-structure in an amount of 25-50 wt %, more preferably 25-40 wt %, further preferably 25-35 wt %, based on the weight of said hydrogenated styrenic thermoplastic elastomer. By controlling the contents of said styrenic structural unit and said 1,2-structure within the above ranges, it is possible to ensure that the composition and the cement block have a desired self-healing ability, and maintaining the long term self-healing ability of the composition and the cement block, preventing the excessive absorption of natural gas by the composition and the cement block, thereby decreasing or even losing its repairing capability.

The styrenic thermoplastic elastomer described above can regulate its oil and gas expansion performance while ensuring the polarity of the self-healing agent, and can save manufacturing cost.

The above composition can be prepared by initially uniformly mixing a hydrogenated styrenic elastomer polymer with an inorganic filler and then melting the mixed material under melting conditions of the polymer, subjecting the melt mixed material to extrusion granulation to obtain pellets, and then coating the pellets with the hydrophilic polymer.

A second aspect of the invention provides a method for preparing the aforesaid composition, the method comprises the following steps:

(1) uniformly mixing a hydrogenated styrenic thermoplastic elastomer with an inorganic filler to obtain a mixed material, and subjecting the mixed material to extrusion granulation under the melting conditions of said hydrogenated styrenic thermoplastic elastomer;

(2) coating the pellets obtained in step (1) with a hydrophilic polymer to obtain the granular self-healing particles.

The requirements relating to the types and used amounts of hydrogenated styrenic thermoplastic elastomers, hydrophilic polymers and inorganic fillers have been described above and will not be further repeatedly described herein.

In the present invention, a self-healing agent having a structure similar to a core-shell structure is formed by melting a hydrogenated styrenic thermoplastic elastomer, followed by subjecting the melted hydrogenated styrenic thermoplastic elastomer and an inorganic filler to granulating, and subsequently coating a hydrophilic polymer having a relatively high water solubility on a surface of the particles.

In accordance with a preferred embodiment of the present invention, a hydrogenated styrenic thermoplastic elastomer is melted, the melted hydrogenated styrenic thermoplastic elastomer and an inorganic filler are subjected to melting, blending and granulating, and the material obtained from granulation is then subjected to freeze grinding and sieving to obtain pellets with a desired particle size, followed by coating the pellets with a hydrophilic polymer.

Since the hydrophilic polymer has a relatively high water solubility, coating an inorganic filler with a hydrophilic polymer may be accomplished by impregnating/immersing the pellets obtained from step (1) with a solution containing the hydrophilic polymer and then drying the impregnated/immersed pellets, thereby preparing the self-healing agent composition of the present invention.

The hydrophilic polymer may be dissolved/swollen in water and/or an organic solvent, in order to obtain a solution of the hydrophilic polymer. The used amount of water and/or organic solvent is not particularly limited herein, as long as the hydrophilic polymer may be sufficiently dissolved/swollen in water and/or an organic solvent to meet the impregnating/immersing condition, thereby satisfying the requirements of coating.

Preferably, the method further comprises passing the pellets obtained from by the extrusion granulation and freeze grinding through a 20 mesh-200 mesh sieve, preferably a 20 mesh-100 mesh sieve, the sieved material is taken.

The melting conditions and the operations of extrusion granulation, freeze grinding and sieving can be carried out with reference to the prior art, and the contents will not repeatedly described herein.

The hydrogenated styrenic thermoplastic elastomers meeting the requirements of the present invention may be prepared by referring to the method in the prior art, e.g. initially carrying out polymerization, followed by selective hydrogenation, the specific hydrogenation processes are described in, for example, WO 2020/088454. The hydrogenated styrenic thermoplastic elastomers are also commercially available, e.g. commercial product purchased from the Sinopec Baling Petrochemical Company.

The composition of the present invention is used as a self-healing agent and added into the cement slurry for well cementing in an oil/gas field in a ratio of 5-15 wt % to formulate a cement slurry for well cementing with stable properties, after curing of the cement slurry, it exhibits self-healing properties after encountering oil and gas.

The oil and gas may be various oils, gases or mixtures thereof stored in the oil and gas wells, such as methane gas, petroleum and crude oil.

In a third aspect, the invention provides the composition and the cement slurry for well cementing in the oil/gas field comprising the composition produced with the aforesaid preparation method.

Preferably, the composition is contained in an amount of 5-15 wt %, based on the total amount of the cement slurry for well cementing in the oil/gas field.

In addition to the above composition, the cement slurry typically further comprises water and cement.

In a fourth aspect, the invention provides an use of said composition in well cementing in an oil/gas field, preferably an use as a self-healing agent for well cementing in an oil and gas field.

In a fifth aspect, the present invention provides the cement block for well cementing in an oil/gas field and the well cementing in an oil/gas field formed by the cement slurry for well cementing in the oil/gas field.

The cement block for well cementing in an oil/gas field provided by the present invention has a density of 1.6-2 g/cm$^3$, preferably 1.7-2 g/cm$^3$.

Preferably, the cement block for well cementing in an oil/gas field has a flexural strength of 6-8 MPa, an elasticity modulus of 5-7 GPa and a compressive strength of 25-35 MPa.

In a sixth aspect, the invention provides a self-healing method for well cementing in an oil/gas field, the method comprises forming well cementing in an oil/gas field by using the aforesaid cement slurry for well cementing in the oil/gas field, or initially forming a cement block (annulus) by using a cement slurry for well cementing in an oil/gas field, followed by forming a well cementing in an oil/gas field by using the cement block (annulus), and subsequently contacting the well cementing in an oil/gas field with the oil and gas when cracks appear in the well cementing in an oil/gas field.

The aforesaid cement slurry for well cementing in an oil/gas field described above may be made into cement annulus, and the one or more cement annulus can then be overlaid for use in the well cementing in an oil/gas field.

Since the self-healing composition capable of absorbing oil and gas and expanding its volume after absorbing oil and gas is contained in the well cementing material in an oil/gas field, therefore, bring the self-healing composition for well cementing in an oil/gas field into contact with oil and gas when the well cementing in an oil/gas field has cracks, and absorbing the oil and gas to reach the volume expansion, thereby filling and repairing the cracks.

In the present invention, the meaning of bring the self-healing composition for well cementing in an oil/gas field into contact with oil and gas when the well cementing in an oil/gas field has cracks refers to maintaining the state of contacting the well cementing in an oil/gas field with the oil and gas when the cracks emerge, such an arrangement may be implemented prior to the emergence of cracks, the well cementing in an oil/gas field contacts with the oil and gas, the repairing function is performed in advance so as to prevent occurrence of cracks; or the arrangement may be implemented after the emergence of cracks, the well cementing in an oil/gas field contacts with the oil and gas, thereby repairing the cracks. In fact, during the practical operations in oil fields, the well cementing in an oil/gas field is kept in contact with the oil and gas, so that the occurrence of cracks can be prevented or the cracks can be repaired in time after its formation by using said composition of the present invention.

The oil and gas may be one or more of diesel oil, natural gas, petroleum and crude oil.

The contact conditions include an oil and gas pressure of 1-10 MPa, preferably 3-8 MPa. The contact time is determined such that the cracks are filled or the air leakage phenomena no longer occur, the contact time is generally no more than 10 hours, preferably no more than 5 hours.

Unless otherwise specified in the present invention, the pressure refers to a gauge pressure.

Given that the composition provided by the present invention has desirable aging resistance and compatibility with cement, the cement sheath produced therefrom and the well cementing in an oil/gas field exhibit desirable aging resistance and self-healing properties, thereby quickly and efficiently achieving self-healing in regard to the well cementing in an oil/gas field, and maintaining the plugging effect for a long time.

As described by the examples below, with respect to the well cementing in an oil/gas field according to the invention, the flow rate of the natural gas can reduce to 0 (i.e. repair rate 100%) in 5 hours under the conditions that the nature gas is continuously introduced at an initial flow rate of 1,600 ml/min under a temperature of 100° C., until the pressure is constant at 5 MPa; while the repairing of cracks with some compositions in the prior art needs 100 hours or more.

The invention will be described in detail below with reference to examples. The examples are illustrative instead of limitative, the following examples are not intended to restrict the protection scope of the present invention. In the examples below, each of the water-soluble polymers is commercially available, and each of the styrenic thermoplastic elastomers is commercial product purchased from the Sinopec Baling Petrochemical Branch Company. The cement slurry 1 used in the well cementing in an oil/gas field is obtained by mixing the cement having a brand name Jiahua and a grade LHEC 42.5 with water at a weight ratio of 1:1, the cement slurry 1 has a density of 1.85 g/cm³. The cement slurry 2 used in the well cementing in an oil/gas field is obtained by mixing the cement having a brand name Jiahua and a grade LHEC 32.5 with water at a weight ratio of 1:1, the cement slurry 2 has a density of 1.87 g/cm³. The cement slurry 3 used in the well cementing in an oil/gas field is obtained by mixing the cement having a brand name Conch and a grade P-C42.5 with water at a weight ratio of 1:1, the cement slurry 3 has a density of 1.87 g/cm³.

Test method for the real density: refer to the method stipulated in the National Standard GB T21354-2008 of China.

Test method of water contact angle: refer to the method stipulated in the National Standard GB/T36086-2018 of China.

Test method of physical properties of cement (flexural strength, elasticity modulus, compressive strength): refer to the method stipulated in the National Standard GB/T50080-2016 of China.

Test method of diesel oil and/or natural gas absorption expansion ratio: the polymer particles (initial volume was denoted as $V_0$) was fully immersed in the mixed oil and gas consisting of diesel oil and natural gas (in a volume ratio of 1:1), the volume ratio of polymer particles to mixed oil and gas was 1:100, the volume of polymer particles was measured once for every 1 hour, when the volume of polymer particles was not changed during three consecutive measurements, the volume was regarded as the volume of polymer particles after expansion and denoted as V, the expansion ratio was calculated according to the following formula: expansion ratio=$V/V_0$.

In the following Examples and Comparative Examples, unless otherwise indicated, "%" of the content and concentrations refers to "wt. %".

Example 1

Figure 3:
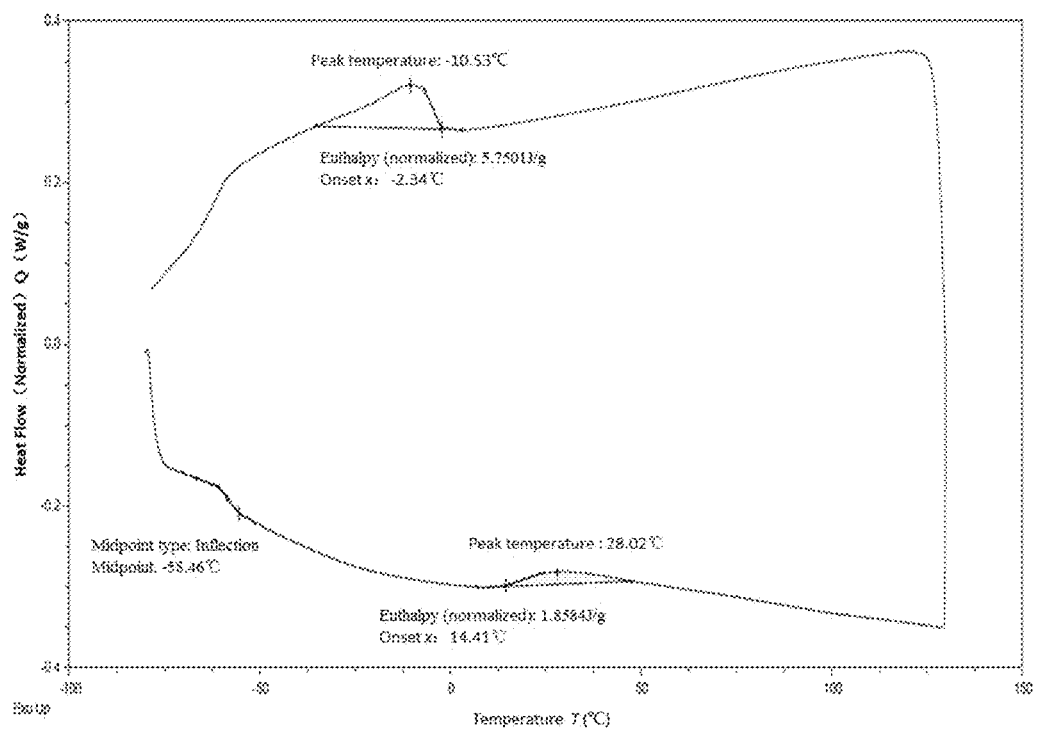
FIG. 3 shows a DSC curve of a self-healing composition prepared in Example 1 of the present invention.

50% by mass of hydrogenated styrene-butadiene-styrene triblock copolymer (with a number average molecular weight of 65,270, a styrene structural unit content of 30 wt %, an 1,2-structure content of 37.7 wt %, a hydrogenation degree of 97.9%) and 50% by mass of precipitated barium sulfate (with a particle size of 15 μm and a density of 4.4 g/cm³) were mixed uniformly, and composite particles of styrenic thermoplastic elastomer and inorganic filler were obtained through the processes of melt blending-pelletizing-freeze grinding-passing through 40 mesh sieve; 200 g of the prepared composite particles were further added to 200 ml of an aqueous solution of polyvinyl alcohol (PEG4000, a hydroxyl value of 0.38 g/g polymer) having a concentration of 3 wt %, stirred uniformly, the mixture was subjected to drying and passing through 40 mesh sieve to produce a styrene thermoplastic elastomer composite self-healing agent coated with polyvinyl alcohol. The self-healing agent particles had a real density of 1.45 g/cm³, the DSC curve was shown in FIG. 3. As can be seen from the DSC curve that the self-healing particles contained hydrogenated styrene-butadiene-styrene triblock copolymer SEBS. The self-healing agent particles were uniformly mixed with the cement slurry 1 for well cementing in an oil/gas field to obtain the cement slurry for well cementing in an oil/gas field. The composition was contained in an amount of 5 wt % based on the total amount of the cement slurry for well cementing in an oil/gas field. After standing still for 12 hours, the cement slurry for well cementing in an oil/gas field did not exhibit an obvious delamination. The results were shown in FIG. 1.

Example 2

50% by mass of hydrogenated styrene-butadiene-styrene triblock copolymer (with a number average molecular weight of 65,270, a styrene structural unit content of 30 wt %, an 1,2-structure content of 37.7 wt %, a hydrogenation degree of 97.9%) and 50% by mass of precipitated barium sulfate (with a particle size of 15 μm and a density of 4.4 g/cm³) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of polyvinyl alcohol (with a number average molecular weight of 4,000, a hydroxyl value of 0.38 g/g polymer) having a concentration of 3 wt %, stirred uniformly, the mixture was subjected to drying and passing through 40 mesh sieve to produce a styrene thermoplastic elastomer composite self-healing agent coated with borax crosslinked polyvinyl alcohol. The self-healing agent particles had a real density of 1.45 g/cm³, and were uniformly blended with the cement slurry 2 for well cementing in an oil/gas field to produce the cement slurry for well cementing in an oil/gas field. The composition was contained in an amount of 10 wt % based on the total amount of the cement slurry for well cementing in an oil/gas field. After standing still for 12 hours, the cement slurry for well cementing in an oil/gas field did not exhibit an obvious delamination.

Example 3

50% by mass of hydrogenated styrene-butadiene-styrene triblock copolymer (with a number average molecular weight of 65,270, a styrene structural unit content of 30 wt %, an 1,2-structure content of 37.7 wt %, a hydrogenation degree of 97.9%) and 50% by mass of precipitated barium sulfate (with a particle size of 15 µm and a density of 4.4 g/cm³) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of guar gum (manufactured by the Guangrao Liuhe Chemical Corporation Limited, with a number average molecular weight of 200,000, a hydroxyl value of 0.6 g/g guar gum) having a concentration of 3 wt %, stirred uniformly, the mixture was subjected to drying and passing through 40 mesh sieve to produce a styrene thermoplastic elastomer composite self-healing agent coated with borax crosslinked guar gum. The self-healing agent particles had a real density of 1.46 g/cm³, and were uniformly blended with the cement slurry 3 for well cementing in an oil/gas field to produce the cement slurry for well cementing in an oil/gas field. The composition was contained in an amount of 15 wt % based on the total amount of the cement slurry for well cementing in an oil/gas field. After standing still for 12 hours, the cement slurry for well cementing in an oil/gas field did not exhibit an obvious delamination.

Example 4

50% by mass of hydrogenated styrene-butadiene-styrene triblock copolymer (with a number average molecular weight of 65,270, a styrene structural unit content of 30 wt %, an 1,2-structure content of 37.7 wt %, a hydrogenation degree of 97.9%) and 50% by mass of precipitated barium sulfate (with a particle size of 15 µm and a density of 4.4 g/cm³) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of chitosan (manufactured by the Nanjing Songguan Biotechnology Co., Ltd., with a number average molecular weight of 50,000, a hydroxyl value of 0.4 g/g) having a concentration of 3 wt %, stirred uniformly, the mixture was subjected to drying and passing through 40 mesh sieve to produce a styrene thermoplastic elastomer composite self-healing agent coated with chitosan. The self-healing agent particles had a real density of 1.44 g/cm³, and were uniformly blended with the cement slurry 1 for well cementing in an oil/gas field to produce the cement slurry for well cementing in an oil/gas field. The composition was contained in an amount of 8 wt % based on the total amount of the cement slurry for well cementing in an oil/gas field. After standing still for 12 hours, the cement slurry for well cementing in an oil/gas field did not exhibit an obvious delamination.

Example 5

50% by mass of hydrogenated styrene-butadiene-styrene triblock copolymer (with a number average molecular weight of 65,270, a styrene structural unit content of 30 wt %, an 1,2-structure content of 37.7 wt %, a hydrogenation degree of 97.9%) and 50% by mass of precipitated barium sulfate (with a particle size of 15 µm and a density of 4.4g/cm³) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of chitosan (manufactured by the Nanjing Songguan Biotechnology Co., Ltd., with a number average molecular weight of 50,000, a hydroxyl value of 0.4 g/g) having a concentration of 2 wt %, stirred uniformly, the mixture was subjected to drying and passing through 40 mesh sieve to produce a styrene thermoplastic elastomer composite self-healing agent coated with chitosan. The self-healing agent particles had a real density of 1.47 g/cm³, and were uniformly blended with the cement slurry 1 for well cementing in an oil/gas field to produce the cement slurry for well cementing in an oil/gas field. The composition was contained in an amount of 6 wt % based on the total amount of the cement slurry for well cementing in an oil/gas field. After standing still for 12 hours, the cement slurry for well cementing in an oil/gas field did not exhibit an obvious delamination.

Example 6

40% by mass of hydrogenated styrene-isoprene-styrene triblock copolymer (with a number average molecular weight of 64,179, a styrene structural unit content of 30 wt %, an 1,2-structure content of 31.6 wt %, a hydrogenation degree of 97.7%) and 60% by mass of silicate cement (with a particle size of 10 µm and a density of 3.70 g/cm³) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 400 ml of an aqueous solution of polymethacrylic acid (with a number average molecular weight of 6,000, a hydroxyl value of 0.37 g/g polymer) having a concentration of 3 wt %, stirred uniformly, the mixture was subjected to drying and passing through 20 mesh sieve to produce a styrene thermoplastic elastomer composite self-healing agent coated with polymethacrylic acid. The self-healing agent particles had a real density of 1.36 g/cm³, and were uniformly blended with the cement slurry 1 for well cementing in an oil/gas field to produce the cement slurry for well cementing in an oil/gas field. The composition was contained in an amount of 6 wt % based on the total amount of the cement slurry for well cementing in an oil/gas field. After standing still for 12 hours, the cement slurry for well cementing in an oil/gas field did not exhibit an obvious delamination.

Example 7

60% by mass of hydrogenated styrene-isobutylene-styrene triblock copolymer (with a number average molecular weight of 65,009, a styrene structural unit content of 25 wt %, an 1,2-structure content of 37.6 wt %, a hydrogenation degree of 98.1%) and 40% by mass of ground calcium carbonate (with a particle size of 15 μm and a density of 2.8 g/cm$^3$) were mixed uniformly, and composite particles of styrenic thermoplastic elastomer and inorganic filler were obtained through the processes of melt blending-pelletizing-grinding-passing through 200 mesh sieve; 200 g of the prepared composite particles were further added to 400 ml of an aqueous solution of polymethacrylic acid (with a number average molecular weight of 6,000, a hydroxyl value of 0.37 g/g polymer) having a concentration of 6 wt %, stirred uniformly, the mixture was subjected to drying and passing through 80 mesh sieve to produce a styrene thermoplastic elastomer composite self-healing agent coated with polymethacrylic acid. The self-healing agent particles had a real density of 1.28 g/cm$^3$, and were uniformly blended with the cement slurry 1 for well cementing in an oil/gas field to produce the cement slurry for well cementing in an oil/gas field. The composition was contained in an amount of 5.5 wt % based on the total amount of the cement slurry for well cementing in an oil/gas field. After standing still for 12 hours, the cement slurry for well cementing in an oil/gas field did not exhibit an obvious delamination.

Example 8

50% by mass of hydrogenated styrene-butadiene-styrene triblock copolymer (with a number average molecular weight of 677,031, a styrene structural unit content of 40 wt %, an 1,2-structure content of 38.2 wt %, a hydrogenation degree of 98.5%) and 50% by mass of precipitated barium sulfate (with a particle size of 15 μm and a density of 4.4 g/cm$^3$) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of sodium alginate (manufactured by the Sichuan Huatang Jurui Biotechnology Co., Ltd., with a number average molecular weight of 20,000, a carboxyl —COOH content of 0.3 g/g) having a concentration of 3 wt %, stirred uniformly, the mixture was subjected to drying and passing through 40 mesh sieve to produce a styrene thermoplastic elastomer composite self-healing agent coated with sodium alginate. The self-healing agent particles had a real density of 1.46 g/cm$^3$, and were uniformly blended with the cement slurry 1 for well cementing in an oil/gas field to produce the cement slurry for well cementing in an oil/gas field. The composition was contained in an amount of 13 wt % based on the total amount of the cement slurry for well cementing in an oil/gas field. After standing still for 12 hours, the cement slurry for well cementing in an oil/gas field did not exhibit an obvious delamination.

Example 9

50% by mass of hydrogenated styrene-butadiene-styrene triblock copolymer (with a number average molecular weight of 95,300, a styrene structural unit content of 30 wt %, an 1,2-structure content of 37.6 wt %, a hydrogenation degree of 97.9%) and 50% by mass of precipitated barium sulfate (with a particle size of 15 μm and a density of 4.4 g/cm$^3$) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of sodium alginate (manufactured by the Sichuan Huatang Jurui Biotechnology Co., Ltd., with a number average molecular weight of 20,000, a carboxyl —COOH content of 0.3 g/g) having a concentration of 3 wt %, stirred uniformly, the mixture was subjected to drying and passing through 40 mesh sieve to produce a styrene thermoplastic elastomer composite self-healing agent coated with sodium alginate. The self-healing agent particles had a real density of 1.47 g/cm$^3$, and were uniformly blended with the cement slurry 1 for well cementing in an oil/gas field to produce the cement slurry for well cementing in an oil/gas field. The composition was contained in an amount of 13 wt % based on the total amount of the cement slurry for well cementing in an oil/gas field. After standing still for 12 hours, the cement slurry for well cementing in an oil/gas field did not exhibit an obvious delamination.

Example 10

50% by mass of hydrogenated styrene-butadiene-styrene triblock copolymer (with a number average molecular weight of 136,901, a styrene structural unit content of 30 wt %, an 1,2-structure content of 38.1 wt %, a hydrogenation degree of 98.0%) and 50% by mass of precipitated barium sulfate (with a particle size of 15 μm and a density of 4.4 g/cm$^3$) were mixed uniformly, and composite particles of styrenic thermoplastic elastomer and inorganic filler were obtained through the processes of melt blending-pelletizing-grinding-passing through 40 mesh sieve; 200 g of the prepared composite particles were further added to 200 ml of an aqueous solution of sodium alginate (manufactured by the Sichuan Huatang Jurui Biotechnology Co., Ltd., with a number average molecular weight of 20,000, a carboxyl —COOH content of 0.3 g/g) having a concentration of 3 wt %, stirred uniformly, the mixture was subjected to drying and passing through 40 mesh sieve to produce a styrene thermoplastic elastomer composite self-healing agent coated with sodium alginate. The self-healing agent particles had a real density of 1.48 g/cm$^3$, and were uniformly blended with the cement slurry 1 for well cementing in an oil/gas field to produce the cement slurry for well cementing in an oil/gas field. The composition was contained in an amount of 13 wt % based on the total amount of the cement slurry for well cementing in an oil/gas field. After standing still for 12 hours, the cement slurry for well cementing in an oil/gas field did not exhibit an obvious delamination.

Example 11

50% by mass of hydrogenated styrene-butadiene-styrene triblock copolymer (with a number average molecular weight of 65,270, a styrene structural unit content of 30 wt %, an 1,2-structure content of 37.7 wt %, a hydrogenation degree of 97.9%) and 50% by mass of precipitated barium sulfate (with a particle size of 15 μm and a density of 4.4g/cm$^3$) were mixed uniformly, and composite particles of styrenic thermoplastic elastomer and inorganic filler were obtained through the processes of melt blending-pelletizinggrinding-passing through 40 mesh sieve; 200 g of the prepared composite particles were further added to 200 ml of an aqueous solution of sodium alginate (manufactured by the Sichuan Huatang Jurui Biotechnology Co., Ltd., with a number average molecular weight of 20,000, a carboxyl —COOH content of 0.3 g/g) having a concentration of 3 wt %, stirred uniformly, the mixture was subjected to drying and passing through 40 mesh sieve to produce a styrene thermoplastic elastomer composite self-healing agent coated with sodium alginate. The self-healing agent particles had a real density of 1.45 g/cm$^3$, and were uniformly blended with the cement slurry 1 for well cementing in an oil/gas field to produce the cement slurry for well cementing in an oil/gas field. The composition was contained in an amount of 13 wt % based on the total amount of the cement slurry for well cementing in an oil/gas field. After standing still for 12 hours, the cement slurry for well cementing in an oil/gas field did not exhibit an obvious delamination.

Example 12

The self-healing agent composition was prepared according to the method of Example 4, except that the hydrogenated styrene-butadiene-styrene triblock copolymer had a 1,2-structure content of 20.5%. The obtained self-healing agent particles were uniformly blended with the cement slurry 1 for well cementing in an oil/gas field, the results were shown in Table 1.

Example 13

The self-healing agent composition was prepared according to the method of Example 4, except that the hydrogenated styrene-butadiene-styrene triblock copolymer had a 1,2-structure content of 48.5%. The obtained self-healing agent particles were uniformly blended with the cement slurry 1 for well cementing in an oil/gas field, the results were shown in Table 1.

Example 14

The self-healing agent composition was prepared according to the method of Example 4, except that a weight ratio of the hydrogenated styrene-butadiene-styrene triblock copolymer to the precipitated barium sulfate was 25:75. The produced self-healing agent particles had a real density of 1.65 g/cm$^3$, and were uniformly blended with the cement slurry 1 for well cementing in an oil/gas field, the results were shown in Table 1.

Example 15

The self-healing agent composition was prepared according to the method of Example 4, except that the hydrogenated styrene-butadiene-styrene triblock copolymer had a degree of hydrogenation of 90.0%. The produced self-healing agent particles were uniformly blended with the cement slurry 1 for well cementing in an oil/gas field, the results were shown in Table 1.

Example 16

A self-healing agent composition was prepared according to the method of Example 4, except that the polymer was an star-type hydrogenated styrene-butadiene block copolymer having a single-arm number average molecular weight of 80,295, a total number average molecular weight of 250,679, a styrene structural unit content of 32 wt %, an 1,2-structure content of 37.7 wt %, and a hydrogenation degree of 98.1%. The produced self-healing agent particles were uniformly blended with the cement slurry 1 for well cementing in an oil/gas field, the results were shown in Table 1.

Example 17

A self-healing agent composition was prepared according to the method of Example 4, except that the polymer was an star-type hydrogenated styrene-butadiene block copolymer having a single-arm number average molecular weight of 90,548, a total number average molecular weight of 291,533, a styrene structural unit content of 32 wt %, an 1,2-structure content of 37.9 wt %, and a hydrogenation degree of 98.0%. The produced self-healing agent particles were uniformly blended with the cement slurry 1 for well cementing in an oil/gas field, the results were shown in Table 1.

Example 18

A self-healing agent composition was prepared according to the method of Example 4, except that the polymer was an star-type hydrogenated styrene-butadiene block copolymer having a single-arm number average molecular weight of 99,270, a total number average molecular weight of 310,590, a styrene structural unit content of 32 wt %, an 1,2-structure content of 38.5 wt %, and a hydrogenation degree of 97.5%. The produced self-healing agent particles were uniformly blended with the cement slurry 1 for well cementing in an oil/gas field, the results were shown in Table 1.

Comparative Example 1

The self-healing agent was prepared according to the method of Example 4, except that it did not include a mixing step with an aqueous solution of chitosan, that is, 50% by mass of the hydrogenated styrene-butadiene-styrene triblock copolymer and 50% by mass of precipitated barium sulfate were mixed uniformly, the composite particles of styrenic thermoplastic elastomer and inorganic filler were obtained through the processes of melt blending-pelletizing-grinding-passing through 40 mesh sieve. The composite particles were uniformly blended with the cement slurry 1 for well cementing in an oil/gas field, the results were shown in Table 1.

Comparative Example 2

The self-healing agent composition was prepared according to the method of Example 4, except that the hydrogenated styrene-butadiene-styrene triblock copolymer, chitosan, and precipitated barium sulfate were mixed uniformly, and the self-healing agent particles were obtained through the processes of melt blending-pelletizing-grinding-passing through 40 mesh sieve. The self-healing agent particles were uniformly blended with the cement slurry 1 for well cementing in an oil/gas field, the results were shown in Table 1.

Comparative Example 3

The self-healing agent composition was prepared according to the method of Example 4, except that the hydrogenated styrene-butadiene-styrene triblock copolymer was replaced by the same weight of unhydrogenated styrene-butadiene-styrene triblock copolymer, the number average molecular weight, styrene structural unit content, 1,2-structure content of the styrene-butadiene-styrene triblock copolymer were roughly the same as those of the hydrogenated polymer of Example 4. The self-healing agent particles were uniformly blended with the cement slurry 1 for well cementing in an oil/gas field, the results were shown in Table 1.

Comparative Example 4

The SBS #3 in Table 1 of the Examples according to CN105952413A was used as a self-healing agent. The results of the self-healing agent uniformly mixing with the cement slurry for well cementing in an oil/gas field were shown in Table 1.

TABLE 1

| Example Numbers | Water contact angle, ° | Oil/gas absorption expansion ratio | Whether a delamination is exhibited in 12 hours | Density difference of upper layer and lower layer of the cement slurry (g/cm³) |
|---|---|---|---|---|
| Example 1 | 82 | 9 | No | 0.08 |
| Example 2 | 80 | 9 | No | 0.05 |
| Example 3 | 81 | 9 | No | 0.06 |
| Example 4 | 77 | 10 | No | 0.00 |
| Example 5 | 82 | 10 | No | 0.04 |
| Example 6 | 84 | 9 | No | 0.07 |
| Example 7 | 82 | 12 | No | 0.05 |
| Example 8 | 80 | 8 | No | 0.04 |
| Example 9 | 82 | 12 | No | 0.05 |
| Example 10 | 83 | 12 | No | 0.04 |
| Example 11 | 82 | 10 | No | 0.06 |
| Example 12 | 79 | 9 | No | 0.01 |
| Example 13 | 77 | 6 | No | 0.00 |
| Example 14 | 78 | 7 | No | 0.01 |
| Example 15 | 79 | 7 | No | 0.01 |
| Example 16 | 80 | 9 | No | 0.01 |
| Example 17 | 78 | 10 | No | 0.00 |
| Example 18 | 79 | 10 | No | 0.00 |
| Comparative Example 1 | 121 | 7 | Layered | 0.35 |
| Comparative Example 2 | 97 | 7 | Layered | 0.23 |
| Comparative Example 3 | 86 | 4 | No | 0.04 |

Performance Testing

Figure 5:
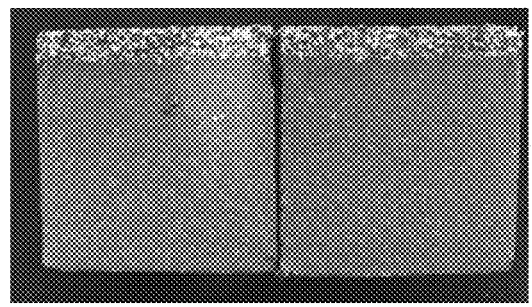
FIG. 5 shows photographs of the cement block produced with the self-healing composition of different meshes by the present invention.
Figure 5:
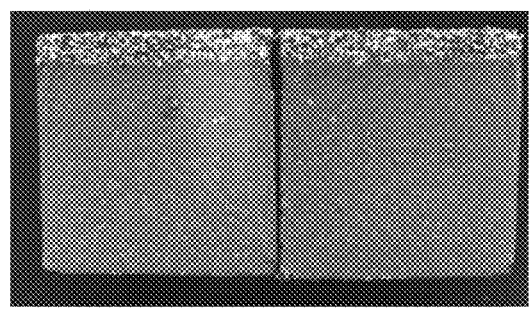
Figure 5:
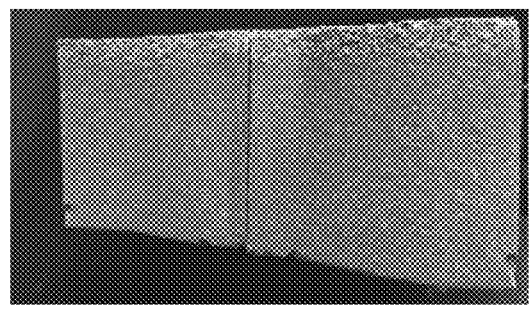

The cement blocks with dimensions 4×4×15 cm were prepared by using the cement slurries of the aforementioned Examples and Comparative Examples respectively, wherein a photograph of the external shape of said cement block in Example 1 was shown in FIG. 5. The mechanical properties of the cement blocks in each of the Example and Comparative Example after maintenance at 80° C. for 48 hours were shown in Table 2 below.

Figure 2:
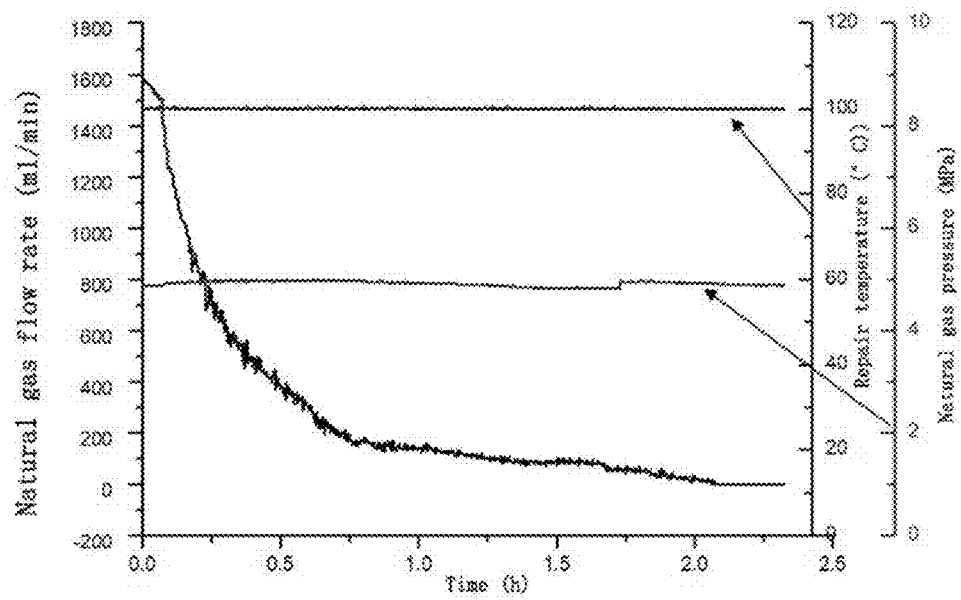
FIG. 2 illustrates a graph showing the self-healing effect of the self-healing composition prepared in Example 1 of the present invention.
Figure 4:
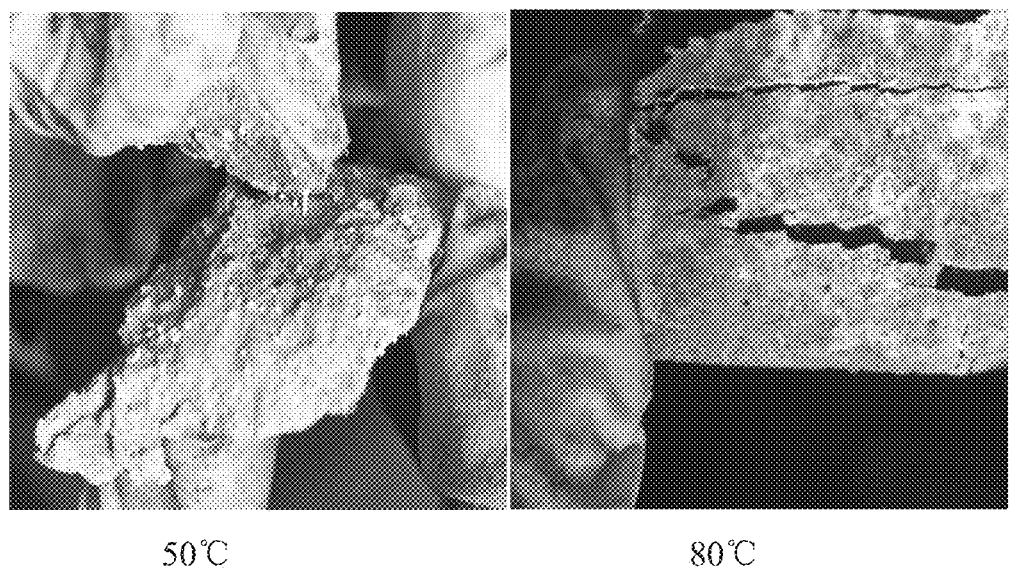
FIG. 4 illustrates a graph showing the wire drawing phenomenon for the self-healing composition prepared in Example 1 of the present invention under different temperatures.

The cement blocks were stacked into a simulated cylindrical well with a diameter of 1 m and a height of 1 m, and the cracks of 500 µm×350 µm were formed on each cement block; the nature gas was continuously introduced into the well at an initial flow rate of 1,600 ml/min under a temperature of 100° C., until the pressure in said well was constant at 5 MPa, the time when the natural gas flow rate decreased to 0 (i.e. repair rate 100%) was recorded, the results were shown in FIG. 2 and Table 2 below. The wire drawing phenomenon of Example 1 was shown in FIG. 4.

TABLE 2

| | Real density (g/cm³) | Compressive strength (MPa) | Elasticity modulus (GPa) | Flexural strength (MPa) | The time when the natural gas flow rate decreased to 0 (hours) |
|---|---|---|---|---|---|
| Example 1 | 1.89 | 30.38 | 5.75 | 6.31 | 2.5 |
| Example 2 | 1.88 | 29.13 | 6.01 | 6.88 | 2.6 |
| Example 3 | 1.88 | 31.27 | 5.97 | 6.44 | 2.6 |
| Example 4 | 1.89 | 32.19 | 5.81 | 6.38 | 2.5 |
| Example 5 | 1.89 | 29.18 | 5.90 | 6.17 | 2.5 |
| Example 6 | 1.87 | 28.44 | 5.88 | 6.35 | 2.8 |
| Example 7 | 1.87 | 30.01 | 5.63 | 6.27 | 2.0 |
| Example 8 | 1.89 | 27.66 | 5.92 | 6.02 | 2.2 |
| Example 9 | 1.87 | 32.13 | 5.65 | 7.13 | 2.4 |
| Example 10 | 1.88 | 29.45 | 5.91 | 6.97 | 2.4 |
| Example 11 | 1.89 | 30.49 | 5.63 | 7.09 | 2.5 |
| Example 12 | 1.87 | 28.16 | 6.46 | 7.08 | 3.4 |
| Example 13 | 1.93 | 29.35 | 7.90 | 6.54 | 4.2 |
| Example 14 | 1.88 | 30.03 | 6.99 | 7.11 | 4.5 |
| Example 15 | 1.89 | 30.15 | 6.70 | 7.33 | 4.7 |
| Example 16 | 1.87 | 31.28 | 6.54 | 6.89 | 2.5 |
| Example 17 | 1.89 | 29.90 | 6.77 | 7.12 | 2.4 |
| Example 18 | 1.87 | 30.19 | 6.96 | 7.46 | 2.4 |
| Comparative Example 1 | 1.88 | 19.56 | 7.15 | 5.39 | Failure to reach full repair |
| Comparative Example 2 | 1.89 | 19.77 | 6.55 | 5.80 | Failure to reach full repair |
| Comparative Example 3 | 1.87 | 19.19 | 6.35 | 5.87 | Failure to reach full repair |
| Comparative Example 4 | 1.72 | 18.16 | 12.44 | 5.46 | Failure to reach full repair |

As can be seen from the results of the above table, the composition of the present invention can be used for producing the obviously better self-healing properties.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A composition, wherein the composition has a density of 1.2-2 g/cm³, a water contact angle not more than 90°, and a diesel oil and/or natural gas absorption expansion ratio of 5-15 times,
   wherein the composition comprises a hydrogenated styrenic thermoplastic elastomer, a hydrophilic polymer and an inorganic filler, wherein the hydrophilic polymer is coated on the surfaces of said hydrogenated styrenic thermoplastic elastomer and said inorganic filler, a weight ratio of said hydrogenated styrenic thermoplastic elastomer to said inorganic filler is from 30:70 to 70:30:
   wherein a weight ratio of the hydrogenated styrenic thermoplastic elastomer to the hydrophilic polymer is from 1:0.01 to 1:10.1, and
   wherein the hydrophilic polymer contains hydrophilic functional group, which is one or more selected from the group consisting of a hydroxyl radical, an amino group and a carboxyl group.

2. The composition of claim 1, wherein the composition has a density of 1.4-1.8 g/cm$^3$;
and/or, the composition has a water contact angle less than 85°;
and/or, the diesel oil and/or natural gas absorption expansion ratio of 8-12 times.

3. The composition of claim 1, wherein the composition is a sieved material obtained after passing through 20 mesh to 200 mesh sieve.

4. The composition of claim 1, wherein the hydrogenated styrenic thermoplastic elastomer is one or more selected from the group consisting of hydrogenated styrene-butadiene-styrene triblock copolymer, hydrogenated styrene-isoprene-styrene triblock copolymer, and styrene-isobutylene-styrene triblock copolymer;
and/or, the hydrogenated styrenic thermoplastic elastomer has a hydrogenation degree of 95-100%.

5. The composition of claim 1, wherein the hydrogenated styrenic thermoplastic elastomer has a linear structure or a star structure, and the linear structure having a number average molecular weight of 40,000-150,000, the star structure having a number average molecular weight of 120,000-320,000;
and/or, the hydrogenated styrenic thermoplastic elastomer contains styrenic structural units in an amount of 20-50 wt % and 1,2-structure in an amount of 25-40 wt %, based on the weight of said hydrogenated styrenic thermoplastic elastomer.

6. The composition of claim 1, wherein the inorganic filler has a density of 2.5-6 g/cm$^3$ and a particle size of 5-20 μm;
and/or, the inorganic filler is one or more selected from the group consisting of ground calcium carbonate, barium sulfate, iron ore powder, cement, quartz sand and barite.

7. The composition of claim 1, wherein and/or, the content of hydrophilic functional groups in the hydrophilic polymer is 0.1-0.6 g/g polymer.

8. A method for preparing a composition, the method comprises the following steps:
(1) uniformly mixing a hydrogenated styrenic thermoplastic elastomer with an inorganic filler to obtain a mixed material, and subjecting the mixed material to extrusion granulation under the melting conditions of said hydrogenated styrenic thermoplastic elastomer;
(2) coating the pellets obtained in step (1) with a hydrophilic polymer to obtain a granular material,
wherein a weight ratio inorganic filler to the hydrogenated styrenic thermoplastic elastomer is from 30:70 to 70:30, and a weight ratio of the hydrogenated styrenic thermoplastic elastomer to the hydrophilic polymer is from 1:0.01 to 1:10.1, and
wherein the hydrophilic polymer contains hydrophilic functional group, which is one or more selected from the group consisting of a hydroxyl radical, an amino group and a carboxyl group.

9. The preparation method of claim 8, wherein the hydrogenated styrenic thermoplastic elastomer is one or more selected from the group consisting of hydrogenated styrene-butadiene-styrene triblock copolymer, hydrogenated styrene-isoprene-styrene triblock copolymer, and styrene-isobutylene-styrene triblock copolymer;
and/or, the hydrogenated styrenic thermoplastic elastomer has a hydrogenation degree of 95-100%.

10. The preparation method of claim 8, wherein the hydrogenated styrenic thermoplastic elastomer has a linear structure or a star structure, and the linear structure having a number average molecular weight of 40,000-150,000, the star structure having a number average molecular weight of 120,000-320,000;
and/or, the hydrogenated styrenic thermoplastic elastomer contains styrenic structural units in an amount of 20-50 wt % and 1,2-structure in an amount of 25-40 wt %, based on the weight of said hydrogenated styrenic thermoplastic elastomer.

11. The preparation method of claim 8, wherein the inorganic filler has a density of 2.5-6 g/cm$^3$, and a particle size of 5-20 μm;
and/or, the inorganic filler is one or more selected from the group consisting of ground calcium carbonate, barium sulfate, iron ore powder, cement, quartz sand and barite.

12. The preparation method of claim 8, wherein the content of hydrophilic functional groups in the hydrophilic polymer is 0.1-0.6 g/g polymer.

13. The preparation method of claim 8, wherein the coating is carried out by impregnating the pellets obtained in step (1) with a solution comprising a hydrophilic polymer and then drying the impregnated pellets.

14. The preparation method of claim 8, the method further comprising passing the pellets obtained by the extrusion granulation through a 20 mesh-200 mesh sieve.

15. A cement slurry for well cementing in the oil/gas field comprising the composition of claim 1.

16. The cement slurry for well cementing in the oil/gas field of claim 15, wherein the composition is contained in an amount of 5-15 wt %, based on the total amount of the cement slurry for well cementing in the oil/gas field.

* * * * *